United States Patent
Tsukamoto et al.

(10) Patent No.: US 7,142,754 B2
(45) Date of Patent: Nov. 28, 2006

(54) PLASTIC OPTICAL FIBER, PLASTIC OPTICAL FIBER CABLES, OPTICAL FIBER CABLES WITH PLUGS WITH COPOLYMER

(75) Inventors: Yoshihiro Tsukamoto, Otake (JP); Yasushi Kawaharada, Otake (JP); Kikue Irie, Otake (JP); Tetsuya Jigami, Otake (JP); Jun Okumura, Toyama (JP); Yoshihiro Uozu, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/169,126

(22) PCT Filed: Dec. 27, 2000

(86) PCT No.: PCT/JP00/09275

§ 371 (c)(1),
(2), (4) Date: Jun. 27, 2002

(87) PCT Pub. No.: WO01/48538

PCT Pub. Date: Jul. 5, 2001

(65) Prior Publication Data

US 2003/0021564 A1   Jan. 30, 2003

(30) Foreign Application Priority Data

Dec. 27, 1999  (JP)  ................... 11/370295

(51) Int. Cl.
   *G02B 6/16*   (2006.01)
(52) U.S. Cl. ....................... 385/123; 385/141
(58) Field of Classification Search ........... 385/123, 385/124, 141–145; 427/163.1; 313/123
   See application file for complete search history.

(56) References Cited

U.S. PATENT DOCUMENTS

| | | | |
|---|---|---|---|
| 4,684,705 A | | 8/1987 | Yamamoto et al. |
| 4,804,259 A | * | 2/1989 | Sasaki et al. ............ 385/145 |
| 4,836,642 A | * | 6/1989 | Matsumoto et al. ....... 385/145 |
| 4,946,902 A | * | 8/1990 | Bekiarian et al. ........ 525/326.2 |
| 5,076,659 A | * | 12/1991 | Bekiarian et al. ......... 385/143 |
| 5,148,511 A | | 9/1992 | Savu et al. |
| 5,206,926 A | * | 4/1993 | Yamamoto et al. ........ 385/143 |
| 5,239,026 A | | 8/1993 | Babirad et al. |
| 5,242,972 A | | 9/1993 | Negishi et al. |
| 5,942,560 A | | 8/1999 | Idogawa et al. |
| 6,188,824 B1 | * | 2/2001 | Teshima .................. 385/126 |

FOREIGN PATENT DOCUMENTS

| | | |
|---|---|---|
| EP | 0 301 912 A2 | 2/1989 |
| EP | 0883001 A1 | 12/1996 |
| EP | 0849283 A2 | 6/1998 |
| EP | 0872745 A1 | 10/1998 |
| JP | 63-180907 | * 7/1988 |
| JP | 1-321259 | 12/1989 |
| JP | 2-29408 | 1/1990 |
| JP | 7-64064 | 3/1995 |
| JP | 07-239420 | 9/1995 |
| JP | 07-239420 A | 9/1995 |
| JP | 07239420 A | * 9/1995 |
| WO | WO 93/04132 | 3/1993 |
| WO | WO 93/09065 | 5/1993 |

* cited by examiner

*Primary Examiner*—Joseph Williams
*Assistant Examiner*—Dalei Dong
(74) *Attorney, Agent, or Firm*—Fitch, Even, Tabin & Flannery

(57) ABSTRACT

This invention relates to a copolymer prepared by polymerizing at least a vinyl compound (A) which gives a homopolymer with a refractive index of 1.50 or more, a fluoroalkyl (meth)acrylate (B) represented by the following formula (1) and methyl methacrylate (C), wherein a weight ratio of monomer (A) component/monomer (B) component ((A)/(B)) in the copolymer is within the range of 0.2 to 1; as well as a plastic optical fiber and a plastic optical fiber cable comprising a clad made of the copolymer. This invention can provide a plastic optical fiber and a plastic optical fiber cable exhibiting a reduced transmission loss, minimizing increase in a transmission loss even when being held as a bobbin-wound form, exhibiting a reduced bend loss and can transmit a wide-band data.

(1)

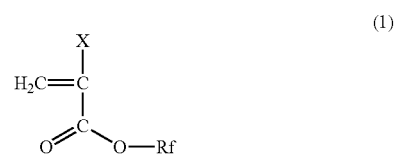

(In the above formula, X represents H or $CH_3$; and Rf represents fluoroalkyl having 7 to 14 carbon atoms both inclusive and 13 to 25 fluorine atoms both inclusive.).

21 Claims, No Drawings

PLASTIC OPTICAL FIBER, PLASTIC OPTICAL FIBER CABLES, OPTICAL FIBER CABLES WITH PLUGS WITH COPOLYMER

CROSS-REFERENCED APPLICATIONS

This application is the 371 National phase of International Application PCT/JP00/09275, filed Dec. 27, 2000, which designated the U.S. and that International Application was not published under PCT Article 21(2) in English.

TECHNICAL FIELD

This invention relates to a plastic optical fiber with a lower numerical aperture suitable for high-speed communication; a copolymer suitably used as a clad in the optical fiber; a plastic optical fiber cable; and a plastic optical fiber cable with a plug.

BACKGROUND ART

A plastic optical fiber (hereinafter, referred to as an "optical fiber" as appropriate) has been practically used for short-range communication applications such as lighting, FA, OA and LAN because of its advantageous characteristics such as a lower cost, a light weight, flexibility and a larger diameter although its transmission distance is shorter than that of a quartz optical fiber. Most of plastic optical fibers practically used to date have a core-clad structure with a core made of polymethyl methacrylate (PMMA), and have recently been expected to be used as a high-speed communication media in combination with a visible red light source operable with a high speed.

Technique for expanding a band in an optical fiber with a core-clad structure has been disclosed in JP-A 7-239420 and WO 96/36894, where a band in an optical fiber is expanded by reducing a difference in a refractive index between a core and a clad to reduce a numerical aperture in the optical fiber (NA reduction). The optical fibers described in these publications have improved a transmission band at a transmission distance of 50 m to 200 MHz by reducing a numerical aperture to about 0.3.

Various clads have been proposed for such an optical fiber. For example, JP-As 7-239420, 9-101423 and 9-159844 have disclosed a clad made of 1 to 30 wt % of a long-chain fluoroalkyl methacrylate, 1 to 20 wt % of a short-chain fluoroalkyl methacrylate and 50 to 98 wt % of methyl methacrylate and having an MI value of 5 to 60 g/10 min. JP-A 11-133252 has disclosed a clad made of a long-chain fluoroalkyl methacrylate and methyl methacrylate. JP-A 10-221543 has disclosed a clad made of 10 to 40 mol % of a short-chain fluoroalkyl methacrylate and 60 to 90 mol % of methyl methacrylate. These clads, however, exhibit inadequate strength.

On the other hand, as an optical fiber with a clad exhibiting higher strength, JP-As 8-101316 and 10-104455 have disclosed an optical fiber with a clad made of a vinylidenefluoride polymer or polymer mixture. When producing an optical fiber with a low numerical aperture using such a clad, a vinylidenefluoride polymer is used as a mixture with polymethyl methacrylate (PMMA) because the polymer itself has a low refractive index. However, such an optical fiber has drawbacks such as a significantly reduced transparency and increase in a transmission loss when bending the optical fiber.

As a technique for improving strength of a clad made of a fluoroalkyl methacrylate polymer, JP-Bs 7-11604 and 7-11605 and JP-As 1-76003, 1-105205, 1-223104, 3-062809 and 4-051206 have disclosed that a 2-(perfluorooctyl)ethyl methacrylate unit (referred to as "17FM") as a rubber component is added to a copolymer for a clad to improve strength of the clad. The 17FM unit, however, reduces a refractive index of the copolymer. Therefore, when a copolymer contains the 17FM unit at a larger amount for improving strength of the clad, a refractive index of the copolymer is reduced so that an optical fiber using the copolymer as a clad may have an increased numerical aperture.

Thus, strength of a clad has not been adequately improved in an optical fiber with a lower transmission loss and a lower numerical aperture. There has been, therefore, a problem that when holding such an optical fiber as a bobbin-wound form common in storing or delivery, a transmission loss of the optical fiber is increased.

DISCLOSURE OF THE INVENTION

An objective of this invention is to provide a plastic optical fiber, a plastic optical fiber cable and a plastic optical fiber cable with a plug each of which exhibits a reduced transmission loss, minimizes increase in a transmission loss even when being held as a bobbin-wound form, exhibits a reduced bend loss and can transmit a wide-band data. Another objective of this invention is to provide a copolymer suitable for a clad in a plastic optical fiber which exhibits a higher refractive index, good transparency and higher mechanical strength.

This invention relates to a plastic optical fiber with a numerical aperture of 0.35 or less and a transmission loss of 150 dB/km or less at a driving NA of 0.1 for a wavelength of 650 nm, wherein increase in a transmission loss is 80 dB/km or less when the plastic optical fiber is heated at 60° C. for 24 hours while being wound under a winding tension of 700 gf around a periphery of a cylinder with a cross-sectional diameter of 20 cm.

This invention also relates to a plastic optical fiber cable comprising the above plastic optical fiber coated with a coating layer, wherein increase in a transmission loss is 80 dB/km or less when the plastic optical fiber cable is heated at 60° C. for 24 hours while being wound under a winding tension of 1000 gf around a periphery of a cylinder with a cross-sectional diameter of 20 cm.

This invention also relates to a copolymer having a refractive index of 1.45 or more wherein a rupture deflection is 7.5 mm or more as determined by the ASTM D790 bending test [test piece dimensions; length: 5 inch (12.7 cm), width: 0.5 inch (1.27 cm), thickness: 0.25 inch (0.635 cm); distance between supports: 10 cm; head speed: 3 mm/min].

This invention also relates to a copolymer prepared by polymerizing at least a vinyl compound (A) which gives a homopolymer with a refractive index of 1.50 or more (hereinafter, referred to as "monomer (A)" as appropriate), a fluoroalkyl (meth)acrylate (B) represented by the following formula (1) (hereinafter, referred to as "monomer (B)" as appropriate) and methyl methacrylate (C) (hereinafter, referred to as "monomer (C)" as appropriate), wherein a weight ratio of monomer (A) component/monomer (B) component ((A)/(B)) in the copolymer is within the range of 0.2 to 1:

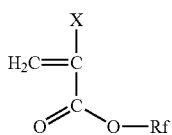

(1)

wherein X represents H or $CH_3$; and Rf represents a fluoroalkyl having 7 to 14 carbon atoms both inclusive and 13 to 25 fluorine atoms both inclusive.

This invention also relates to the above copolymer comprising a (meth)acrylate unit as the monomer (A) component.

This invention also relates to the above copolymer comprising a benzyl methacrylate unit as the monomer (A) component.

This invention also relates to the above copolymer comprising an aromatic vinyl compound unit as the monomer (A) component.

This invention also relates to the above copolymer comprising a monomer unit consisting of a (meth)acrylate represented by the following formula (2) or methyl acrylate (D) (hereinafter, referred to as "monomer (D)" as appropriate) as a copolymer component:

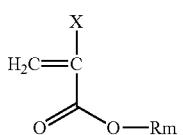

(2)

where X represents H or $CH_3$; and Rm represents an alkyl having 2 to 4 carbon atoms both inclusive.

This invention also relates to a plastic optical fiber comprising a core made of a polymethyl methacrylate or a copolymer mainly containing methyl methacrylate unit and a clad made of the above copolymer.

This invention also relates to a plastic optical fiber cable comprising the above plastic optical fiber coated with a coating layer.

This invention also relates to a plastic optical fiber cable with a plug wherein a plug is attached at least to one end of the above plastic optical fiber cable.

An optical fiber, an optical fiber cable and an optical fiber cable with a plug according to this invention exhibit a reduced transmission loss, minimize increase in a transmission loss even when being held as a bobbin-wound form, exhibit a reduced bend loss and can transmit a wide-band data.

A copolymer according to this invention exhibits a higher refractive index, good transparency and higher mechanical strength, and can be, therefore, suitably used as a clad in an optical fiber.

BEST MODE FOR CARRYING OUT THE INVENTION

Preferred embodiments of this invention will be detailed.

An optical fiber or optical fiber cable has been frequently shipped as a bobbin-wound form as is other fiber materials. A widely used bobbin has a configuration where a cylinder with a cross-sectional diameter (shell diameter) of about 10 to 40 cm has brims at both ends, in the light of preventing damage on the optical fiber and improving handling properties. Preferably, an optical fiber is wound around a bobbin with a narrow distance between optical fibers (pitch) and a tension as low as possible within the range where winding is not disturbed, for preventing deteriorated properties due to damage on the optical fiber, as described in, for example, JP-A 1-321259. Suitable machines for winding an optical fiber around a bobbin while controlling a tension include those having structures where an optical fiber is wound while controlling a tension in the optical fiber with a tension roll or torque motor and transversing a guide or bobbin. A proper winding tension depends on many factors such as the diameter of an optical fiber or cable to be wound and the shell diameter of a bobbin, but is preferably about several hundred gf for winding an optical fiber with a diameter of 1 mm and several hundreds to about 700 gf for winding a single-core fiber cable with a diameter of 2.2 mm, using a bobbin with a shell diameter of 20 cm.

In previously proposed optical fibers with a lower NA, a transmission loss is increased during long-term storage while being wound around a bobbin as described above. This tendency is more significant for an optical fiber with a lower transmission loss.

In view of the problems, this invention provides a plastic optical fiber with a numerical aperture of 0.35 or less and a transmission loss of 150 dB/km or less, wherein increase in a transmission loss is 80 dB/km or less, more preferably 70 dB/km or less when the plastic optical fiber is heated at 60° C. for 24 hours while being wound under a winding tension of 700 gf around a periphery of a cylinder with a cross-sectional diameter of 20 cm.

An optical fiber cable according to this invention comprising the above optical fiber coated with a coating layer exhibits increase in a transmission loss of 80 dB/km or less, preferably 50 dB/km or less when the optical fiber is heated at 60° C. for 24 hours while being wound under a winding tension of 1000 gf around a periphery of a cylinder with a cross-sectional diameter of 20 cm.

Such an optical fiber or optical fiber cable according to this invention exhibits less increase in a transmission loss even after long-term storage, e.g., a year or longer, while being wound around a bobbin, and can be easily handled. In this invention, a transmission loss in an optical fiber or optical fiber cable is determined using light at a wavelength of 650 nm and a driving NA of 0.1.

An optical fiber according to this invention may have a known structure; for example, an SI type optical fiber having a core-clad structure, a GI type optical fiber in which a refractive index gradually reduces from the center to a periphery, a multilayer optical fiber in which a refractive index in a core stepwise reduces from the center to a periphery, and a multicore optical fiber in which a plurality of islands are integrated while being separated from each other by a common sea. A multilayer optical fiber is preferable for conducting high-speed signal transmission by expanding an optical fiber band. In this invention, a core is a part through which a propagating light within an optical fiber mainly passes, and a clad is a part which is disposed on the periphery of the core for reflecting and refracting a light to confine the light within the core. The clad may comprise two or more layers. When the islands are comprised of cores alone in a multicore optical fiber, the sea plays a role of a clad.

In this invention, a numerical aperture of an optical fiber is preferably adjusted to 0.35 or less, more preferably 0.3 or less, for expanding a transmission band while it is preferably 0.2 or more for improvement in a bending loss and connection properties. A numerical aperture (hereinafter, referred to as "NA" as appropriate) as used herein is a parameter as $NA=(n_{core}^2-n_{clad}^2)^{0.5}$ where $n_{core}$ and $n_{clad}$ are refractive indices of a core and a clad, respectively.

An optical fiber according to this invention can be prepared by a known process such as multi-component melt spinning.

The periphery of the optical fiber may be coated with a protective layer. The protective-layer coated structure is preferable because more light can be taken into the optical fiber and mechanical properties of the optical fiber may be improved by appropriately selecting a protective layer material with good dynamic properties. A protective layer as used herein is an optically transparent layer; specifically, a layer deposited on the outermost periphery of an optical fiber which can contribute reflection and refraction of a light during transmitting the light by the optical fiber.

The protective layer coating may be conducted by multi-component melt spinning of a core and a clad simultaneously. Alternatively, it may be formed by passing an optical fiber through a solution of a protective layer material in a solvent and then evaporating the solvent.

An optical fiber cable according to this invention may be produced by depositing a coating layer on the periphery of the above optical fiber. The coating layer may be deposited on the periphery of the optical fiber by a known process, which can be appropriately selected depending on a coating material, but in the light of processability, melt coating using a T-shape die and coating are preferable.

A core in the optical fiber according to this invention may be made of a known material such as a methyl methacrylate homopolymer (PMMA), a copolymer mainly composed of a methyl methacrylate unit, a variety of methacrylate polymers and polycarbonates. For providing an optical fiber with good transmittance, it is preferable to use PMMA or a copolymer mainly composed of a methyl methacrylate unit as a core material. The copolymer mainly composed of a methyl methacrylate unit comprises preferably 50 wt % or more, more preferably 70 wt % or more of the methyl methacrylate unit.

A clad for an optical fiber according to this invention is preferably made of a copolymer according to this invention wherein a rupture deflection is 7.5 mm or more as determined by the ASTM D790 bending test [test piece dimensions: 5 inch (12.7 cm)(length)×0.5 inch (1.27 cm)(width)× 0.25 inch (0.635 cm)(thickness); distance between supports: 10 cm; head speed: 3 mm/min].

Two forces are applied to an optical fiber wound around a bobbin, i.e., a tension along the optical fiber axis and a force from bobbin while the optical fiber is pressed on the bobbin (stress). The ASTM D790 bending test evaluates elasticity and rupture properties while bending the material by applying a load to the center between two supports at the ends of a test piece. In this test, the force applied to the test piece is similar in direction to the force applied to the optical fiber wound around the bobbin. Thus, a copolymer whose rupture deflection is 7.5 mm or more as determined by the bending test may be used as a clad for an optical fiber to prevent crazes generated in a core-clad interface in the optical fiber wound around the bobbin to which the above tension and stress are applied, or cracks or breakage in the clad due to growing of the crazes, and therefore, may effectively reduce increase in a transmission loss in the optical fiber during long-term storage while being wound around the bobbin. The rupture deflection as determined by the above test for the copolymer according to this invention is preferably 9 mm or more.

When using a copolymer according to this invention as a clad in an optical fiber, particularly while using PMMA as a core, a refractive index of the copolymer is preferably 1.45 or more, more preferably 1.455 or more for adequately reducing a numerical aperture of the optical fiber and improving a transmission band of the optical fiber. Since an excessively large refractive index tends to increase bending loss in the optical fiber, a refractive index of the copolymer according to this invention is preferably 1.477 or less, particularly when using PMMA as a core.

A copolymer with a higher refractive index exhibiting a large rupture deflection as determined by the above test is preferably a copolymer prepared by polymerizing a vinyl compound (A) giving a homopolymer with a refractive index of 1.50 or more, a fluoroalkyl (meth)acrylate (B) represented by formula (1) and methyl methacrylate (C). These monomers may be polymerized by a known process. A weight ratio of monomer (A) component/monomer (B) component ((A)/(B)) in the copolymer is preferably within the range of 0.2 to 1.

In the copolymer according to this invention, a vinyl compound giving a homopolymer with a refractive index of 1.50 or more may be added as a copolymer component to reduce a content of the methyl methacrylate unit which increases rigidity and to increase a content of the fluoroalkyl (meth)acrylate unit which increases flexibility, while maintaining a higher refractive index as a copolymer. Thus, the copolymer may be designed to have improved strength and exhibit an optimum refractive index within the above range when using the copolymer as a clad in an optical fiber.

Examples of a vinyl compound giving a homopolymer with a refractive index of 1.50 or more (A) include (meth) acrylates and aromatic vinyl compounds.

Examples of a (meth)acrylate giving a homopolymer with a refractive index of 1.50 or more include methacrylates having an aromatic group such as benzyl methacrylate, phenyl methacrylate, phenethyl methacrylate and naphthyl methacrylate; methacrylates having a chlorinated ester group; and methacrylates having an alicyclic group such as adamantyl methacrylate and tricyclodecyl methacrylate (Hitachi Chemical Co. Ltd., FA513M). Among others, benzyl methacrylate is preferable because its homopolymer exhibits proper flexibility and heat resistance and has a higher refractive index of 1.568 whereby a content of the methyl methacrylate unit may be reduced in the copolymer while increasing a content of the fluoroalkyl (meth)acrylate unit, as well as has good reactivity with methyl methacrylate so that transparency of the copolymer may be improved.

The (meth)acrylate unit giving a homopolymer with a refractive index of 1.50 or more is contained preferably at 4 wt % or more, more preferably 10 wt % or more in the copolymer for improving flexibility and mechanical properties of the copolymer, while being preferably 40 wt % or less, more preferably 30 wt % or less for improving optical properties such as transparency in the copolymer.

Examples of an aromatic vinyl compound giving a homopolymer with a refractive index of 1.50 or more include styrene, 4-methoxy-2-methylstyrene, o-methylstyrene, o-methoxystyrene, p-methoxystyrene, o-chlorostyrene and 2,6-dichlorostyrene. Since such a homopolymer has a higher refractive index although being brittle, it can be added to reduce a content of the methyl methacrylate unit in the copolymer while increase a content of the fluoroalkyl (meth)acrylate unit as a rubber component so that strength of the copolymer used in a clad can be significantly improved.

Among others, styrene is preferable because it gives a homopolymer with a particularly higher refractive index of 1.591.

The aromatic vinyl compound may be contained in the copolymer preferably at 4 wt % or more, more preferably 6 wt % or more, for increasing a refractive index of the copolymer and increasing a content of monomer (B) to improve flexibility, while being preferably 25 wt % or less, more preferably 10 wt % or less for reducing brittleness due to the aromatic vinyl compound to improve mechanical properties.

For improving mechanical properties of the copolymer, the fluoroalkyl group (Rf) in the fluoroalkyl (meth)acrylate (B) represented by formula (1) preferably has at least 7 carbon atoms and at least 13 fluorine atoms while for improving transparency of the copolymer, preferably having up to 14 carbon atoms and up to 25 fluorine atoms. Such a fluoroalkyl (meth)acrylate (B) may be an appropriate known monomer including 2-(perfluorooctyl)ethyl methacrylate, 2-(perfluorohexyl)ethyl methacrylate and 2-(perfluorodecyl) ethyl methacrylate. A content of the fluoroalkyl (meth) acrylate (B) unit in the copolymer is preferably 15 wt % or more for improving flexibility and mechanical properties of the copolymer while being preferably 60 wt % or less for improving transparency and heat resistance.

A weight ratio of the vinyl compound (A) component/the fluoroalkyl (meth)acrylate (B) component ((A)/(B)) in the copolymer is preferably within the range of 0.2 to 1. If it is less than 0.2, flexibility of the copolymer may be deteriorated so that increase of a transmission loss due to holding the fiber around a bobbin when using it as a clad in the optical fiber may be insufficiently reduced. If it is more than 1, mechanical properties of the clad polymer may be deteriorated.

A content of the methyl methacrylate (C) unit in the copolymer is preferably 10 wt % to 70 wt %, more preferably 10 wt % to 60 wt %. If a content of methyl methacrylate (C) is less than 10 wt %, thermolysis resistance of the copolymer may be reduced. If it is more than 70 wt %, rigidity of the copolymer may become too high to sufficiently reduce increase of a transmission loss due to holding the optical fiber around the bobbin.

Besides a copolymer prepared by polymerizing monomer (A), monomer (B) and monomer (C), a copolymer according to this invention exhibiting a large rupture deflection and having a higher refractive index as determined by the above test may be preferably a copolymer comprising the (meth) acrylate represented by formula (2) or the methyl acrylate (D) unit. A homopolymer of monomer (D) has a relatively higher refractive index while having a low glass-transition temperature and exhibiting very high flexibility, and therefore, the copolymer can comprise the monomer (D) unit to improve flexibility and mechanical properties of the copolymer. Furthermore, the methyl acrylate unit can be added as the monomer (D) unit to improve thermolysis resistance of the copolymer in addition to the above effects.

It is preferable that the copolymer comprising the monomer (D) unit also comprises the monomer (B) represented by formula (1) and the monomer (C) units. The monomer (B) unit and the monomer (C) unit may be added to provide a copolymer with a higher refractive index exhibiting improved mechanical properties. In addition to these monomer units, the monomer (A) unit may be also contained to increase a content of the monomer (B) unit having good mechanical properties for further improving mechanical properties of the copolymer.

When using a (meth)acrylate as monomer (D), the alkyl group in the (meth)acrylate (D) preferably has 2 to 4 carbon atoms for improving flexibility of the copolymer. Such a (meth)acrylate (D) may be a known monomer including ethyl acrylate, ethyl methacrylate, isopropyl acrylate, isopropyl methacrylate, n-butyl acrylate, i-butyl acrylate, t-butyl acrylate, n-butyl methacrylate, i-butyl methacrylate and t-butyl methacrylate.

A content of the monomer (D) unit in the copolymer is preferably 1 wt % or more, more preferably 5 wt % or more for improving flexibility and mechanical properties of the copolymer, while being preferably 60 wt % or less, more preferably 30 wt % or less for improving transparency of the copolymer. When the copolymer comprises the monomer (A), the monomer (B) or the monomer (C) unit alone or in combination of two or more, contents of the individual monomer units are preferably within the ranges as described for the copolymer comprising the monomer (A), the monomer (B) or the monomer (C) unit.

The copolymer according to this invention may further comprise a copolymer component composed of another monomer. Such a monomer may be, for example, methacrylic acid for improving adhesiveness in a core-clad interface when using a copolymer as a clad material. The copolymer may, as desired, comprise a short-chain fluoroalkyl (meth)acrylate such as trifluoroethyl methacrylate, tetrafluoropropyl methacrylate and pentafluoropropyl methacrylate, and/or a monomer unit such as maleimides and maleic anhydride.

A protective material may be any appropriate material and is preferably a polymer mainly comprising a vinylidenefluoride unit exhibiting both good mechanical properties and good barrier properties to low molecular weight compounds. The vinylidenefluoride unit is contained preferably at 50 mol % or more, more preferably 80 mol % or more, in the polymer.

A coating material used in an optical fiber cable according to this invention may be selected, depending on a desired effect such as improvement in weather resistance or heat resistance; for example, polyethylene (PE), polyvinyl chloride, chlorinated polyethylene and various UV curable resins, preferably thermoplastic resins. For improving heat resistance, a polyamide, Kevlar or a silicone resin may be suitably used.

An optical fiber cable with a plug according to this invention has a configuration where a known plug is disposed at one or both ends of the above optical fiber cable.

EXAMPLES

This invention will be more specifically described with reference to Examples, in which evaluations and measurements were conducted as follows.

Melt Index (MI)

The amount of a polymer discharged from a die nozzle with a diameter of 2 mm and a length of 8 mm at 230° C. for 10 min under a load of 5 kg was determined in grams.

Refractive Index

A film test piece with a thickness of 200 μm was prepared using a melt press, and its refractive index was determined for sodium D line at room temperature (25° C.) using an Abbe refractometer.

Bending Test

This test was conducted in compliance with the ASTM D790 bending test. Using Injection Molding Machine 75MS made by Mitsubishi Heavy Industries, Ltd., a test piece with length of 5 inch (12.7 cm), width of 0.5 inch (1.27 cm) and thickness of 0.25 inch (0.635 cm) was formed. Then, using TENSILON/UTM I2500 made by Toyo Boldwin Inc., the test piece was supported at two points with an intersupport distance of 10 cm. While the test piece was then pressed at its center at a head speed of 3 mm/min, its rupture deflection was determined.

Transmission Loss

A transmission loss was determined at a driving NA=0.1 for a wavelength of 650 nm by a 25 m–5 m cutback method.

Transmission Band

An optical fiber cable of 50 m length was prepared, and its transmission band was determined for −3 dB band at a driving NA=0.25 and a wavelength of 650 nm by an impulse response technique using a sampling oscilloscope.

Repeated Bending Rupture Number

While loading 500 g at one end of an optical fiber cable of 4 m length, the center of the optical fiber cable was sandwiched with two circular pipes with a diameter of 15 mm, the other end of the optical fiber cable was moved to one circular pipe, the optical fiber cable was wound around the periphery of the circular pipe such that the optical fiber cable was bent by 90 degrees, then the cable was moved to the other circular pipe, the cable was wound around the periphery of the circular pipe such that it was bent by 90 degrees, i.e., the optical fiber cable was bent by 180 degrees in total at both ends. The procedure was repeated to determine the number of bending when the optical fiber cable was broken, where bending by 180 degrees in total as described above was counted as one bending.

Bending Loss

An optical fiber cable of 11 m length was used. While introducing a light from one end of the optical fiber cable, the optical fiber cable was bent by 90 degrees with a radius of 25 mm at each of 10 points at intervals of 1 m. While thus bending and holding on a line the cable, the quantity of light emitted from the other end of the optical fiber cable was determined. A light-quantity difference between these beams was used to estimate a bending loss.

Comparative Example 1

To a monomer solution of 25 wt % of 2-(perfluorooctyl) ethyl methacrylate, 74 wt % of methyl methacrylate and 1 wt % of methacrylic acid were added 0.1 wt % of N,N-azobisisobutyronitrile and 0.3 wt % of n-octyl mercaptan. After completely removing dissolved oxygen by nitrogen bubbling, the solution was heated at 60° C. for 8 hours for polymerization. After completion of polymerization, the polymer produced was ground and dried in vacuo at 180° C. for 10 hours to give a polymer for a clad.

The polymer had a melt index of 21 g/10 min and a refractive index of 1.465, and exhibited a rupture deflection of 5.2 mm in the bending test.

The polymer as a clad material, PMMA as a core material and a copolymer of vinylidene fluoride/tetrafluoroethylene=78/22 mol % as a protective material were separately fed to concentric multi-component spinning nozzles at 220° C. to spin a filament with a three layer structure of core/clad/protective layer. The filament was extended to a double length in a hot-air oven at 150° C., and then heated in the hot-air oven at 145° C. to give an optical fiber with a diameter of 1 mm, a clad thickness of 10 μm and a protective-layer thickness of 10 μm.

For the optical fiber, a numerical aperture and a transmission loss determined while holding the optical fiber in a straight line were 0.28 and 134 dB/km, respectively.

Then, 25 m of the optical fiber was wound around a bobbin made of ABS with a shell diameter of 20 cm under a tension of 700 gf, and heated in a hot-air oven at 60° C. for 24 hours. After heating, the fiber wound around the bobbin gave a transmission loss of 247 dB/km, which was higher by 113 dB/km than the transmission loss before heating. In microscopy for the optical fiber after heating, cracks in the clad were observed.

A PE coating layer was formed on the periphery of the optical fiber to provide a plastic optical fiber cable with a diameter of 2.2 mm. For the optical fiber cable, a transmission band, a bending rupture number and a bending loss were 230 MHz, 18500 and 0.24 dB, respectively. The optical fiber cable was wound around a bobbin made of ABS with a shell diameter of 20 cm under a tension of 1000 gf, and heated in a hot-air oven at 60° C. for 24 hours. A transmission loss was increased by 108 dB/km in comparison with the optical fiber cable before heating.

Furthermore, after storing the optical fiber and the optical fiber cable thus prepared while being wound around the bobbin, a transmission loss was considerably increased.

Example 1

A clad material, an optical fiber and an optical fiber cable were prepared as described in Comparative Example 1, except that a copolymer composition for the clad was 33 wt % of 2-(perfluorooctyl)ethyl methacrylate, 12 wt % of benzyl methacrylate, 54 wt % of methyl methacrylate, and 1 wt % of methacrylic acid, and 0.15 wt % of n-octyl mercaptan was added. Winding around a bobbin was conducted as described in Comparative Example 1.

The copolymer for the clad had a melt index of 23 g/10 min and a refractive index of 1.465 and exhibited a deflection of 8.2 mm in the bending test.

A transmission loss for the optical fiber was 132 dB/kg. The optical fiber was wound around a bobbin and heated as described in Comparative Example 1, and then gave a transmission loss of 195 dB/kg, that is, an increase in a transmission loss after heating was 63 dB/km. Microscopy for the optical fiber after heating showed no cracks in the clad. The optical fiber cable wound around a bobbin and heated as described in Comparative Example 1 showed an increase of 42 dB/km in a transmission loss. For the optical fiber cable, a transmission band, a bending rupture number and a bending loss were 220 MHz, 19500 and 0.20 dB, respectively.

Examples 2 to 11 and Comparative Examples 2 to 5

Clad materials, optical fibers and optical fiber cables were prepared as described in Example 1, except that copolymer compositions shown in Table 1 were used for a clad. The evaluation results are also shown in Table 1.

TABLE 1

|  | Composition | MI | Refractive index | Rupture deflection (mm) | Optical fiber (O.F.) NA | O.F. transmission loss (dB/km) |
|---|---|---|---|---|---|---|
| EX. 1 | 17FM/BzMA/MMA/MAA 33/12/54/1 wt % | 23 | 1.465 | 8.2 | 0.28 | 132 |
| EX. 2 | 17FM/BzMA/MMA/MAA 43/28/27/2 wt % | 18 | 1.466 | 9.6 | 0.28 | 136 |
| EX. 3 | 17FM/BzMA/MMA/MAA 38/12/48/2 wt % | 19 | 1.459 | 8.7 | 0.31 | 134 |
| EX. 4 | 17FM/BzMA/MMA/MAA 43/28/21/8 wt % | 22 | 1.465 | 10.1 | 0.28 | 135 |
| EX. 5 | 17FM/TCDMA/MMA/MAA 28/20/51/1 wt % | 19 | 1.464 | 7.2 | 0.29 | 135 |
| EX. 6 | 17FM/St/MMA/MAA 33/9/56/2 wt % | 18 | 1.465 | 7.3 | 0.28 | 136 |
| EX. 7 | 17FM/St/MMA/MAA 30/6/56/2 wt % | 18 | 1.466 | 7.3 | 0.28 | 135 |
| EX. 8 | 17FM/EMA/MMA/MAA 25/50/23/2 wt % | 17 | 1.464 | 7.3 | 0.29 | 132 |
| EX. 9 | 17FM/MA/MMA/MAA 25/5/68/2 wt % | 19 | 1.465 | 7.3 | 0.28 | 134 |
| EX. 10 | 17FM/BA/MMA/MAA 25/5/68/2 wt % | 23 | 1.463 | 7.3 | 0.29 | 133 |
| EX. 11 | 17FM/BMA/MMA/MAA 25/5/58/3 wt % | 26 | 1.465 | 7.3 | 0.28 | 136 |
| Comp. Ex. 1 | 17FM/MMA/MAA 25/74/1 wt % | 21 | 1.465 | 5.2 | 0.28 | 134 |
| Comp. Ex. 2 | 3FM/4FM/17FM/MMA 6/6/14/74 wt % | 23 | 1.469 | 4.4 | 0.26 | 132 |
| Comp. Ex. 3 | 17FM/TCDMA/MMA/MAA 38/40/21/1 wt % | 23 | 1.459 | 7.8 | 0.31 | 140 |
| Comp. Ex. 4 | 17FM/BzMA/MMA 27/5/68 wt % | 21 | 1.464 | 5.9 | 0.28 | 133 |
| Comp. Ex. 5 | PMMA/PVdF blend 60/40 wt % | 15 | 1.464 | 4.4 | 0.29 | 158 |

|  | Bobbin-wound O.F. transmission loss (dB/km) | Increase in Bobbin-wound O.F. transmission loss (dB/km) | Increase in Bobbin-wound cable transmission loss (dB/km) | Cable transmission band (MHz) | Cable bending rupture number | Cable bending loss (dB/km) |
|---|---|---|---|---|---|---|
| EX. 1 | 195 | 63 | 42 | 220 | 19500 | 0.20 |
| EX. 2 | 211 | 75 | 52 | 250 | 22000 | 0.25 |
| EX. 3 | 202 | 68 | 47 | 160 | 21000 | 0.17 |
| EX. 4 | 194 | 59 | 40 | 210 | 22500 | 0.18 |
| EX. 5 | 207 | 72 | 54 | 190 | 19500 | 0.18 |
| EX. 6 | 212 | 76 | 51 | 256 | 22000 | 0.39 |
| EX. 7 | 206 | 71 | 48 | 224 | 21500 | 0.35 |
| EX. 8 | 192 | 70 | 46 | 235 | 22500 | 0.15 |
| EX. 9 | 194 | 70 | 48 | 239 | 22000 | 0.17 |
| EX. 10 | 191 | 68 | 52 | 230 | 21000 | 0.17 |
| EX. 11 | 192 | 66 | 53 | 223 | 21000 | 0.20 |
| Comp. Ex. 1 | 247 | 113 | 108 | 230 | 18500 | 0.24 |
| Comp. Ex. 2 | 264 | 132 | 122 | 210 | 15500 | 0.22 |
| Comp. Ex. 3 | 252 | 102 | 88 | 180 | 17500 | 0.37 |
| Comp. Ex. 4 | 228 | 95 | 92 | 220 | 19000 | 0.21 |
| Comp. Ex. 5 | 209 | 51 | 55 | 230 | 23500 | 0.52 |

BzMA: benzyl methacrylate; BA: n-butyl acrylate; 17FM: 2-(perfluorooctyl)ethyl methacrylate; 3FM: 2,2,2-trifluoroethyl methacrylate; MMA: methacrylate; 4FM: 2,2,3,3,3-tetrafluoropropyl methacrylate; EMA: ethyl metlcacrylate; TCDMA: tricyclodecyl methacrylate; BMA: n-butyl methacrylate; St: styrene; MMA: methacrylic acid; PVdF: polyvinylidene fluoride; MA: methyl acrylate

The invention claimed is:

1. A plastic optical fiber comprising:
   a core made of a polymethylmethacrylate or a copolymer mainly containing methyl methacrylate unit; and
   a clad made of a copolymer prepared by polymerizing at least a vinyl compound (A) which gives a homopolymer with a refractive index of 1.50 or more, fluoroalkyl (meth)acrylate (B) represented by the following formula (1) and methyl methacrylate (C), wherein a weight ratio of monomer (A) component/monomer (B) component ((A)/(B)) in the copolymer is within the range of 0.2 to 1:

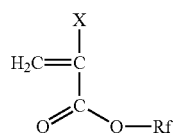

wherein X represents H or CH₃, and Rf represents a fluoroalkyl having 7 to 14 carbon atoms both inclusive and 13 to 25 fluorine atoms both inclusive,
  wherein the copolymer has a refractive index of 1.45 or more and a rupture deflection of 7.5 mm or more as determined by the ASTM D790 bending test (test piece dimensions; length: 5 inch, width: 0.5 inch, thickness: 0.25 inch; distance between supports: 10 cm; head speed: 3 mm/min),
  wherein the plastic optical fiber has a numerical aperture of 0.35 or less and a transmission loss of 150 dB/km or less at a driving NA of 0.1 for a wavelength of 650 nm, and
  wherein the copolymer for the clad comprises a benzyl methacrylate unit as the monomer (A) component.

2. The plastic optical fiber as claimed in claim 1, further comprising a protective layer with which the plastic fiber is coated.

3. The plastic optical fiber as claimed in claim 1, wherein increase in a transmission loss is 80 dB/km or less when the plastic optical fiber is heated at 60° C. for 24 hours while being wound under a winding tension of 700 gf around a periphery of a cylinder with a cross-sectional diameter of 20 cm.

4. A plastic optical fiber cable comprising the plastic optical fiber as claimed in claim 1 coated with a coating layer.

5. The plastic optical fiber cable as claimed in claim 4, wherein increase in a transmission loss is 80 dB/km or less when the plastic optical fiber cable is heated at 60° C. for 24 hours while being wound under a winding tension of 1000 gf around a periphery of a cylinder with a cross-sectional diameter of 20 cm.

6. The plastic optical fiber cable with a plug wherein a plug is attached at least to one end of the plastic optical fiber cable as claimed in claim 4.

7. The plastic optical fiber as claimed in claim 1, wherein the copolymer for the clad comprises a monomer unit consisting of a (meth)acrylate represented by the following formula (2) or methyl acrylate (D) as a copolymer component:

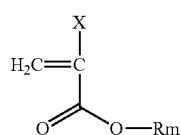

wherein X represents H or CH₃, and Rm represents an alkyl having 2 to 4 carbon atoms both inclusive.

8. The plastic optical fiber as claimed in claim 1, wherein the content of the monomer (A) component in the copolymeris 10 wt. % or more.

9. The plastic optical fiber as claimed in claim 1, wherein the content of the monomer (A) in the copolymer is 10 wt. % to 40 wt. %.

10. A plastic optical fiber comprising:
  a core made of a polymethylmethacrylate or a copolymer mainly containing methyl methacrylate unit; and
  a clad made of a copolymer prepared by polymerizing at least a vinyl compound (A) which gives a homopolymer with a refractive index of 1.50 or more, fluoroalkyl (meth)acrylate (B) represented by the following formula (1) and methyl methacrylate (C),
wherein a weight ratio of monomer (A) component/monomer (B) component ((A)/(B)) in the copolymer is within the range of 0.2 to 1:

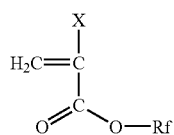

wherein X represents H or CH₃, and Rf represents a fluoroalkyl having 7 to 14 carbon atoms both inclusive and 13 to 25 fluorine atoms both inclusive,
  wherein the copolymer has a refractive index of 1.45 or more and a rupture deflection of 7.5 mm or more as determined by the ASTM D790 bending test (test piece dimensions; length: 5 inch, width: 0.5 inch, thickness: 0.25 inch; distance between supports: 10 cm; head speed: 3 mm/min),
  wherein the plastic optical fiber has a numerical aperture of 0.35 or less and a transmission loss of 150 dB/km or less at a driving NA of 0.1 for a wavelength of 650 nm, and
wherein the copolymer for the clad comprises an aromatic vinyl compound unit as the monomer (A) component.

11. The plastic optical fiber as claimed in claim 10, further comprising a protective layer with which the plastic fiber is coated.

12. The plastic optical fiber as claimed in claim 10, wherein an increase in a transmission loss is 80 dB/km or less when the plastic optical fiber is heated at 60° C. for 24 hours while being wound under a winding tension of 700 gf around a periphery of a cylinder with a cross-sectional diameter of 20 cm.

13. A plastic optical fiber cable comprising the plastic optical fiber as claimed in claim 10 coated with a coating layer.

14. The plastic optical fiber cable as claimed in claim 13, wherein an increase in a transmission loss is 80 dB/km or less when the plastic optical fiber cable is heated at 60° C for 24 hours while being wound under a winding tension of 1000 gf around a periphery of a cylinder with a cross-sectional diameter of 20 cm.

15. The plastic optical fiber cable with a plug wherein a plug is attached at least to one end of the plastic optical fiber cable as claimed in claim 10.

16. The plastic optical fiber as claimed in claim 10, wherein the copolymer for the clad comprises a monomer unit consisting of a (meth)acrylate represented by the following formula (2) or methyl acrylate (D) as a copolymer component:

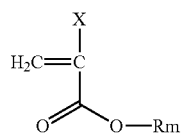 (2)

wherein X represents H or CH$_3$; and Rm represents an alkyl having 2 to 4 carbon atoms both inclusive.

17. The plastic optical fiber as claimed in claim 10, wherein the content of the monomer (A) component in the copolymer is 6 wt. % or more.

18. The plastic optical fiber as claimed in claim 10, wherein the content of the monomer (A) in the copolymer is 6 wt. % to 25 wt. %.

19. The plastic optical fiber as claimed in claim 10, wherein the coploymer for the clad comprises a styrene unit as the monomer (A) component.

20. The plastic optical fiber as claimed in claim 19, wherein the content of the monomer (A) component in the copolymer is 6 wt. % or more.

21. The plastic optical fiber as claimed in claim 19, wherein the content of the monomer (A) in the copolymer is 6 wt. % to 25 wt. %.

* * * * *